United States Patent
Kamimura

(10) Patent No.: US 7,492,380 B2
(45) Date of Patent: Feb. 17, 2009

(54) APPARATUS AND METHOD FOR PROCESSING VIDEO SIGNAL

(75) Inventor: Shigeki Kamimura, Tsurugashima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 621 days.

(21) Appl. No.: 11/156,550

(22) Filed: Jun. 21, 2005

(65) Prior Publication Data

US 2006/0001774 A1    Jan. 5, 2006

(30) Foreign Application Priority Data

Jun. 30, 2004    (JP) .......................... 2004-194572

(51) Int. Cl.
*G09G 5/02*    (2006.01)
(52) U.S. Cl. .................. 345/698; 345/581; 345/606
(58) Field of Classification Search ............... 345/581, 345/698, 699, 606
See application file for complete search history.

(56) References Cited

U.S. PATENT DOCUMENTS

| | | | | |
|---|---|---|---|---|
| 4,771,279 A | * | 9/1988 | Hannah | 345/559 |
| 4,816,898 A | * | 3/1989 | Farley et al. | 348/453 |
| 4,853,779 A | * | 8/1989 | Hammer et al. | 375/240.22 |
| 5,008,739 A | * | 4/1991 | D'Luna et al. | 348/246 |
| 5,177,698 A | * | 1/1993 | Parulski | 708/290 |
| 5,214,676 A | * | 5/1993 | Wilkinson | 375/371 |
| 5,229,853 A | * | 7/1993 | Myers | 348/458 |
| 5,363,213 A | * | 11/1994 | Coward et al. | 382/299 |
| 5,384,904 A | * | 1/1995 | Sprague et al. | 345/668 |
| 5,402,149 A | * | 3/1995 | Amagami et al. | 345/698 |
| 5,469,222 A | * | 11/1995 | Sprague | 348/580 |
| 5,579,455 A | * | 11/1996 | Greene et al. | 345/422 |
| 5,608,824 A | * | 3/1997 | Shimizu et al. | 382/276 |
| 5,646,696 A | * | 7/1997 | Sprague | 348/458 |
| 5,666,164 A | * | 9/1997 | Kondo et al. | 348/441 |
| 5,671,018 A | * | 9/1997 | Ohara et al. | 348/452 |
| 5,701,138 A | * | 12/1997 | Othmer et al. | 345/698 |
| 5,717,617 A | * | 2/1998 | Chester | 708/313 |
| 5,737,019 A | * | 4/1998 | Kim | 375/240.25 |
| 5,796,442 A | * | 8/1998 | Gove et al. | 348/556 |

(Continued)

FOREIGN PATENT DOCUMENTS

JP    2002-374407 A    12/2002

OTHER PUBLICATIONS

Presentation entitled "sv-7 Blazing Visualization on a Commodity Cluster" 'by Byron Alcorn, hp invent, Jul. 2003, 23 pages.

*Primary Examiner*—Kee M Tung
*Assistant Examiner*—Michelle K Lay
(74) *Attorney, Agent, or Firm*—Pillsbury Winthrop Shaw Pittman, LLP

(57)    ABSTRACT

An apparatus for processing a video signal comprises receiving units for receiving video signals, filter units for repeating filtering processing in two or more times of generating a new pixel at a position at which adjacent pixels of the received video signal are mutually weighted by a ratio of roughly 3:1 and generating a new pixel at a position at which precedingly generated adjacent pixels are mutually weighted by a ratio of roughly 3:1, and selection units for respectively selecting a pixel to be extracted among pixels to be performed filtering processing in two or more times on the basis of a scaling ratio to discriminate a position of a pixel to be output.

12 Claims, 10 Drawing Sheets

U.S. PATENT DOCUMENTS

| | | | |
|---|---|---|---|
| 5,801,678 A * | 9/1998 | Huang et al. | 345/667 |
| 5,861,864 A * | 1/1999 | Jensen | 715/203 |
| 6,002,810 A * | 12/1999 | Wakisawa et al. | 382/298 |
| 6,028,589 A * | 2/2000 | Mehra et al. | 345/603 |
| 6,064,437 A * | 5/2000 | Phan et al. | 348/446 |
| 6,067,095 A * | 5/2000 | Danieli | 345/473 |
| 6,108,047 A * | 8/2000 | Chen | 348/581 |
| 6,259,427 B1 * | 7/2001 | Martin et al. | 345/698 |
| 6,286,019 B1 * | 9/2001 | Taylor | 708/303 |
| 6,310,566 B1 * | 10/2001 | McNeely | 341/123 |
| 6,411,333 B1 * | 6/2002 | Auld et al. | 348/441 |
| 6,459,430 B1 * | 10/2002 | Kusumo-Rahardjo et al. | 345/428 |
| 6,556,193 B1 * | 4/2003 | Auld et al. | 345/418 |
| 6,584,154 B1 * | 6/2003 | Wu | 375/240.16 |
| 6,600,514 B1 * | 7/2003 | Van Asma et al. | 348/458 |
| 6,608,699 B2 * | 8/2003 | Kishimoto | 358/1.2 |
| 6,718,072 B1 * | 4/2004 | Sekiya et al. | 382/298 |
| 6,724,398 B2 * | 4/2004 | Someya et al. | 345/690 |
| 6,862,319 B2 * | 3/2005 | Wu | 375/240.16 |
| 7,027,507 B2 * | 4/2006 | Wu | 375/240.03 |
| 7,050,075 B2 * | 5/2006 | Awamoto et al. | 345/690 |
| 2001/0035969 A1 * | 11/2001 | Kishimoto | 358/1.9 |
| 2004/0196407 A1 * | 10/2004 | Gengintani et al. | 348/604 |
| 2005/0068426 A1 * | 3/2005 | Kawasaki et al. | 348/222.1 |
| 2005/0134731 A1 * | 6/2005 | Lee et al. | 348/458 |
| 2006/0077213 A1 * | 4/2006 | Li | 345/660 |

* cited by examiner

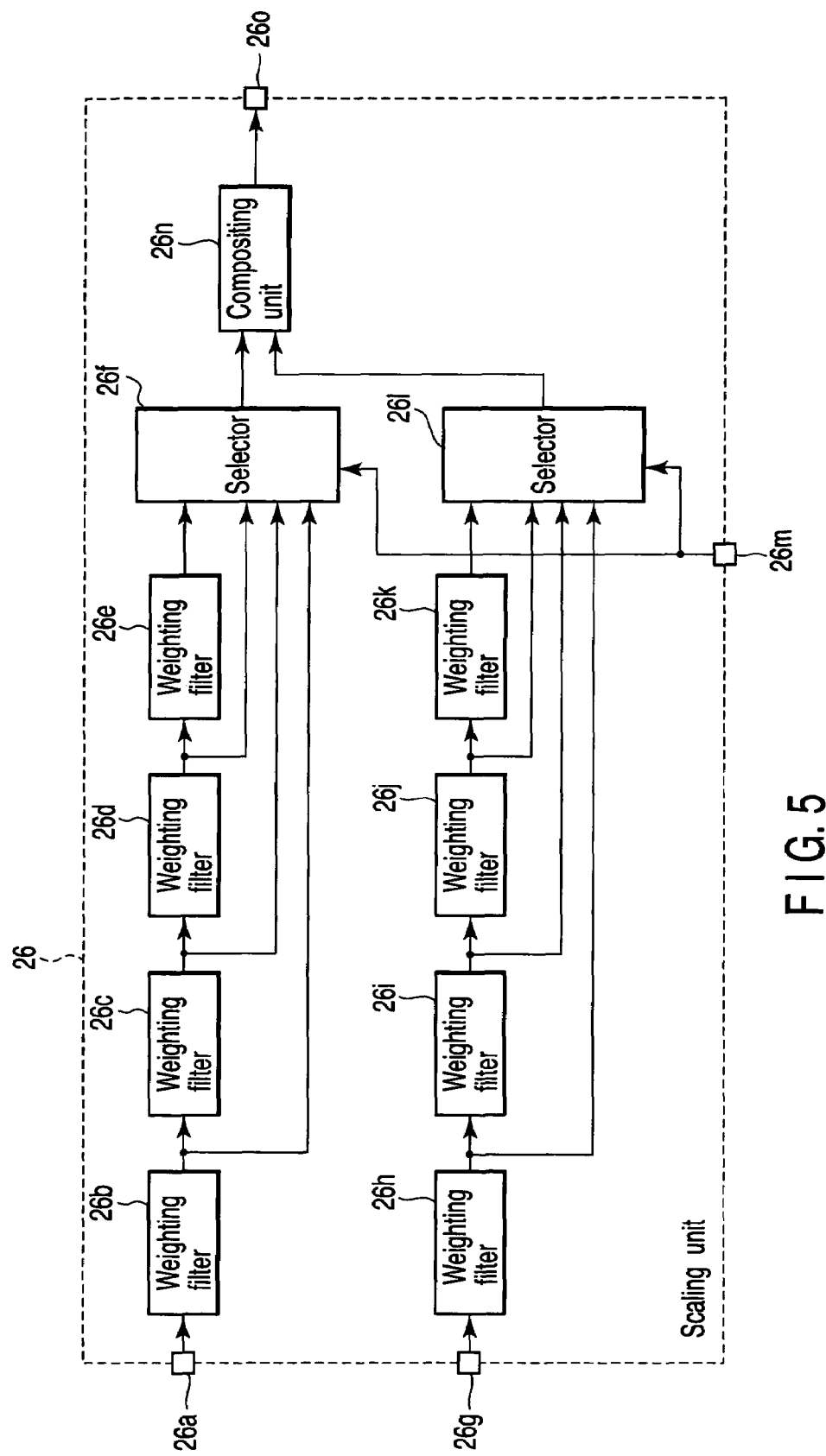
F I G. 5

| Ratio | Generated pixel |
|---|---|
| A ~ B | 1 |
| C ~ D | 2 |
| E ~ F | 3 |
| G ~ H | 4 |

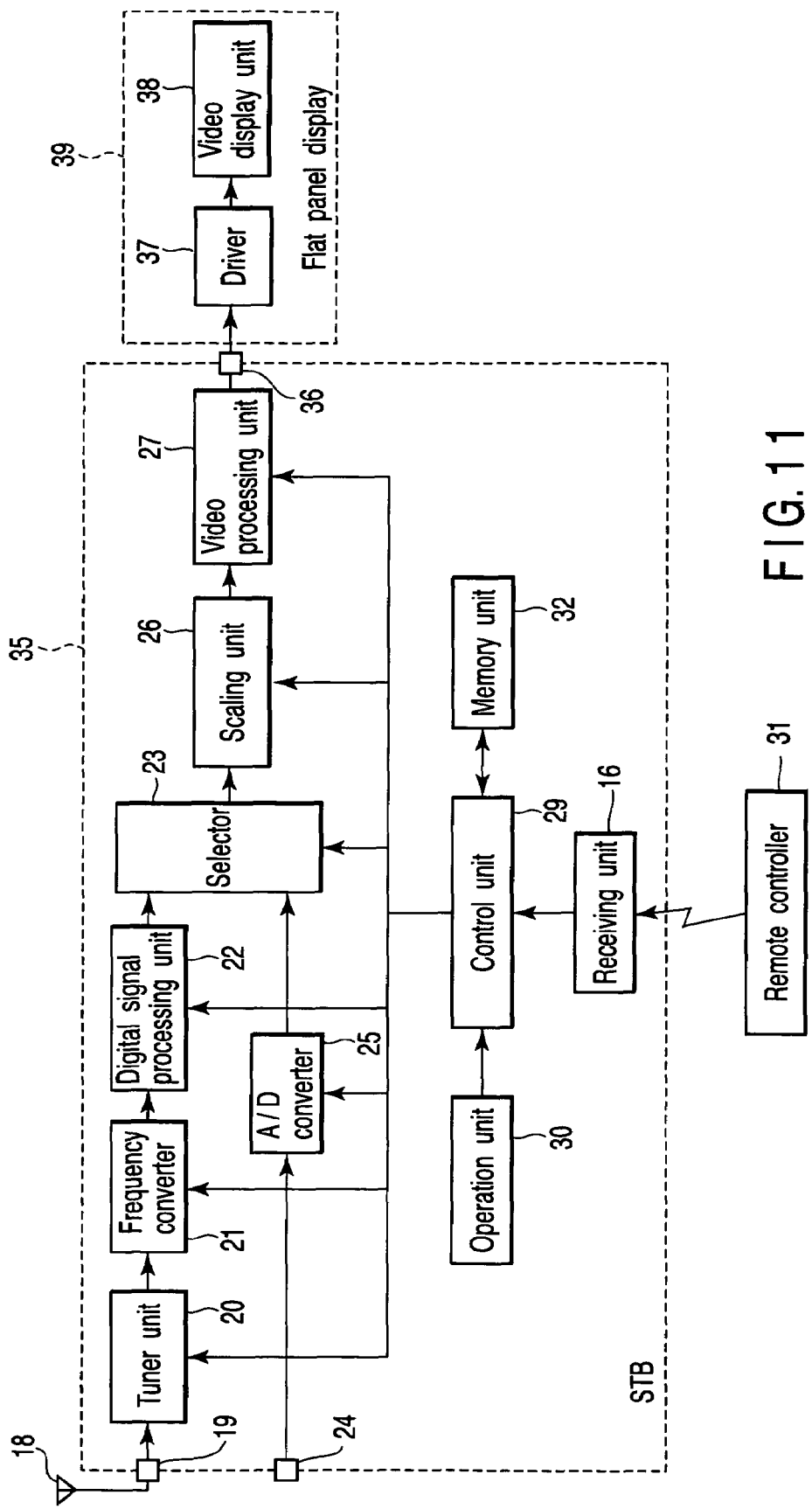
F I G. 11

APPARATUS AND METHOD FOR PROCESSING VIDEO SIGNAL

CROSS-REFERENCE TO RELATED APPLICATIONS

This application is based upon and claims the benefit of priority from prior Japanese Patent Application No. 2004-194572, filed Jun. 30, 2004, the entire contents of which are incorporated herein by reference.

BACKGROUND OF THE INVENTION

1. Field of the Invention

The present invention relates to an apparatus and a method for processing a video signal for displaying a video signal onto, for example, a flat panel type display, and specifically, relates to an improvement in generation of a new pixel for the apparatus, and the method related thereto.

2. Description of the Related Art

In recent years, a flat panel type display using, for example, a liquid crystal panel or a plasma display panel has become widely used. For this kind of display, a video projection type, or so called projector tends to become widely used.

Incidentally, such a flat panel type display generates a new pixel from a pixel of an input video signal by using a weighting filter so as to conduct so-called scaling for matching the number of pixels of the input signal to the number of pixels of a display panel.

However, according to a conventional scaling means, it is likely to make scaling strips be thick and stand out, if scaling in which the number of pixels to be newly generated is close to that of an original pixels, that is, scaling with a low magnification such as scaling of 1.1 times is conducted.

This is because a property of the weighting filter, in the case of generating a pixel at an intermediate point between adjacent original pixels, is different from that in the case of generating a pixel at a position matched to that of the original pixel. In other words, in the case of generating a pixel at the intermediate point of the adjacent original pixels, a low pass characteristic of the weighting filter becomes stronger than the case of the generation of the pixel at the position matched to that of the original pixel.

As mentioned above, when the low pass characteristic of the weighting filter is varied in accordance with the generated pixels, a section with noise greatly reduced therein and a part with the noise slightly reduced therein are respectively generated, so that intensities of the two types of noise are shown as stripes. Especially, in the case of low magnification scaling, the intensities of the two types of noise are shown as stripes with noticeable thickness.

A configuration for selecting interpolation coefficients from a reference table on the basis of address positions set in response to magnification is disclosed in Jpn. Pat. Appln. KOKAI Publication No. 2002-374407. In this configuration, the reference table with a plurality of interpolation coefficients for conducting interpolation processing by multiplying them by an adjacent plurality of pixels stored thereon is prepared, by corresponding to each address position at which the intervals of the adjacent pixels of the original pixel are divided into the number n, respectively. However, the technique for scaling by generating the new pixels from the original pixel is sill in a developing stage and it is therefore strongly desired to develop a method further appropriate for practical use in respect of a variety of points.

BRIEF SUMMARY OF THE INVENTION

According to an embodiment of the present invention, an apparatus for processing a video signal comprises a receiving unit which receives a video signal, a filter unit which repeats two or more times of processing of generating a new pixel at a position at which adjacent pixels of the received video signal are mutually weighted by a ratio of roughly 3:1 and generating a new pixel at a position at which precedingly generated adjacent pixels are mutually weighted by a ratio of roughly 3:1, and a selection unit which selects a pixel to be extracted among pixels processed in two or more times through the filter unit on the basis of the scaling ratio to discriminate a position of a pixel to be output.

According to an another embodiment of the present invention, a method for processing a video signal comprises receiving a video signal, repeating two or more times filtering processing of generating a new pixel at a position at which adjacent pixels of the received video signal are mutually weighted by a ratio of roughly 3:1 and generating a new pixel at a position at which precedingly generated adjacent pixels are mutually weighted by a ratio of roughly 3:1, and selecting a pixel to be extracted among pixels processed two or more times of the filtering processing on the basis of the scaling ratio to discriminate a position of a pixel to be output.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a block diagram for explaining the details of a scaling unit of the TV receiving apparatus in the embodiment;

FIG. 11 is a block diagram for explaining one example of a set top box (STB) with the present invention adopted thereto.

DETAILED DESCRIPTION OF THE INVENTION

Figure 1:
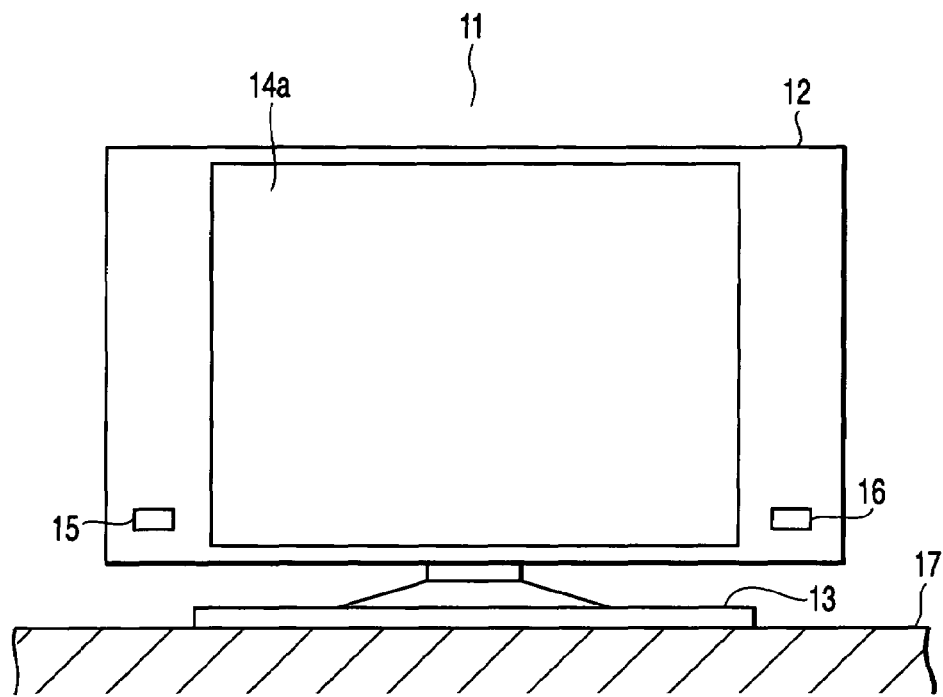
FIG. 1 is a view showing an embodiment of the invention and a front elevation view for explaining an external appearance of a television (TV) receiving apparatus.
Figure 2:
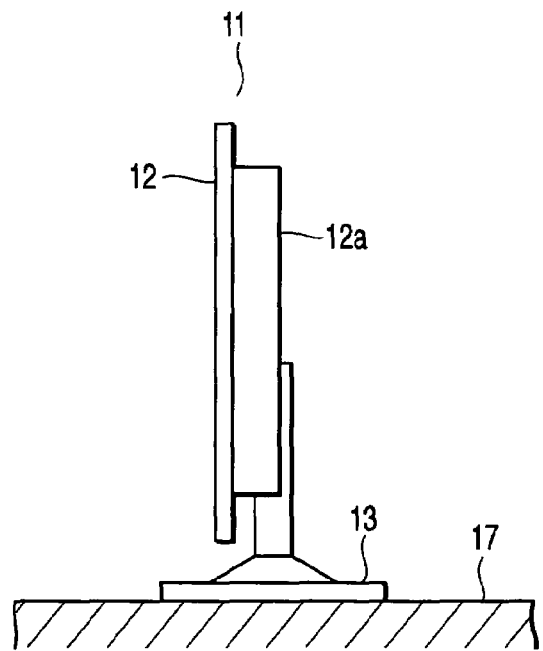
FIG. 2 is a side elevation view for explaining the external appearance of the TV receiving apparatus in the embodiment.

Hereinafter, the details of an embodiment of the present invention will be explained by referring drawings. FIG. 1 and FIG. 2 show a front view and a side view of a TV receiving apparatus 11 of a flat panel type which will be explained in this embodiment, respectively.

The TV receiving apparatus 11 is composed of mainly a cabinet 12, a support base 13 to support the cabinet 12. A front center part of the cabinet 12 is provided with a display panel 14a of a later-mentioned video display unit 14.

On the both sides of the display panel 14a of the cabinet 12 is provided a power switch 15 and a receiving unit 16 for receiving operation information transmitted from a wireless remote controller (not shown). Moreover, a housing unit 12a with the later-mentioned signal processing system housed therein is disposed on the rear side of the cabinet 12.

On the other hand, the support base 13 is rotatably connected to a rear central part of the cabinet 12 and configured to make the cabinet 12 stand rise in a state that the support base 13 is mounted on a horizontal surface of a prescribed base stand 17.

Figure 3:
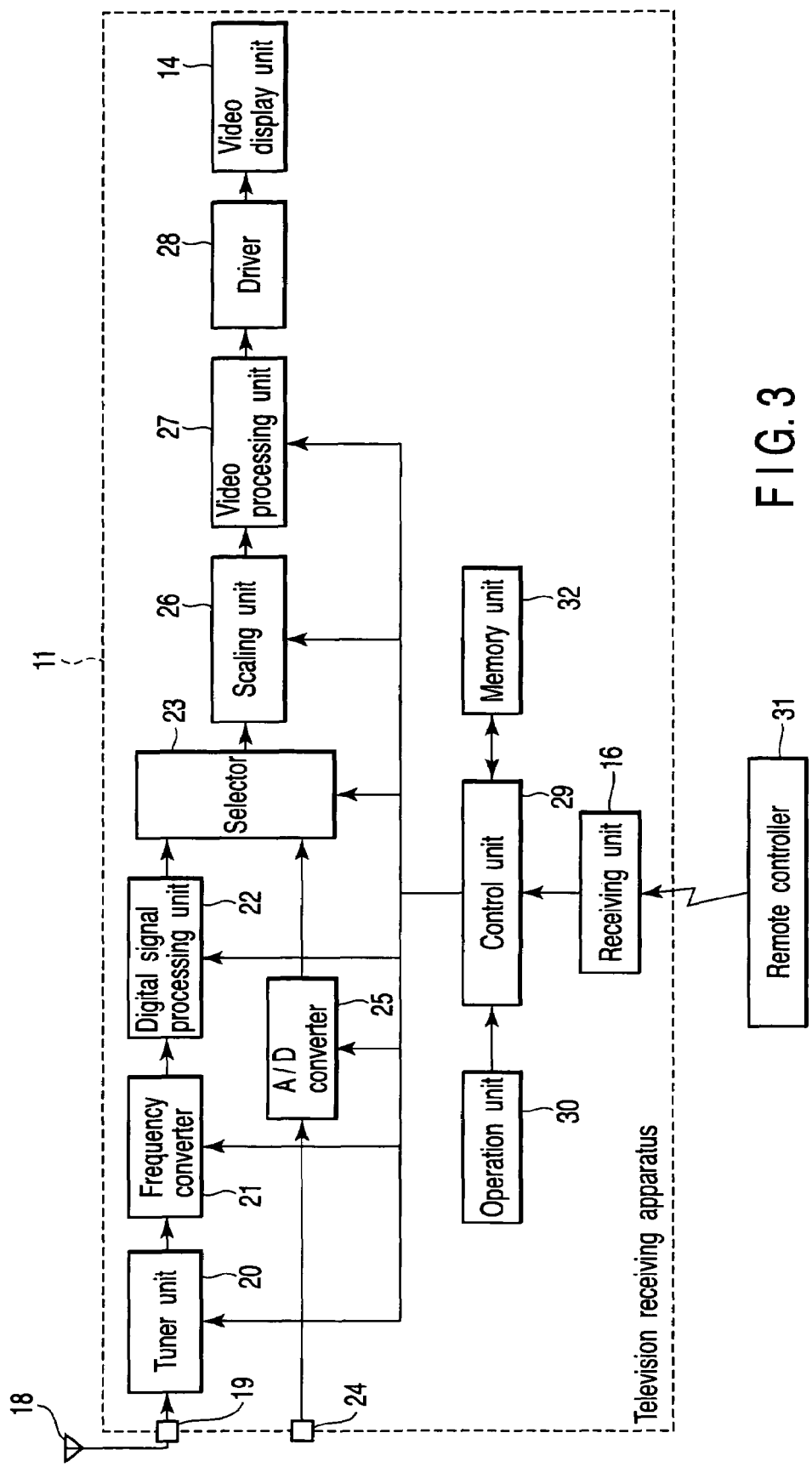
FIG. 3 is a block diagram for explaining a signal processing system of the TV receiving apparatus in the embodiment.

FIG. 3 shows the signal processing system of the TV receiving apparatus 11. That is, a TV broadcast signal received via an antenna 18 is supplied to a tuner unit 20 through an input terminal 19 and a broadcast signal of a prescribed channel is tuned.

The broadcast signal output from the tuner unit 20 is supplied to a frequency converter 21 to be converted into an intermediate signal, then, recovered to a digital video signal by means of a digital signal processing unit 22, and supplied to a selector 23.

Meantime, the TV receiving apparatus 11 receives a video signal generated in a component format or an RGB format from an external arbitrary source via an input terminal 24. The video signal supplied to the input terminal 24 is supplied to an analog/digital (A/D) converter 25 to be converted into a digital signal, then supplied to the selector 23.

The selector 23 selectively outputs two kinds of video signals to be input, to a scaling unit 26. The scaling unit 26 performs scaling processing of the input video signal so as to match the number of pixels of the input video signal to the number of the pixels of the display panel 14a of the video display unit 14 to output the processed video signal to a video processing unit 27.

The video processing unit 27 performs processing of the input video signal so as to make a video display on the video display unit 14. Then, the video signal output from the video processing unit 27 is supplied to the video display unit 14 via a driver 28 to enable video display.

Here, the whole operation, including a variety of receiving operations described above, of the TV receiving apparatus 11, are controlled by a control unit 29. The control unit 29 incorporates a central processing unit (CPU) (not shown), etc., receives operation information from an operation unit 30 including a power switch 15, or receives operation information transmitted from a remote controller 31 through the receiving unit 16 and respectively controls each unit so that operation contents in the operation information are reflected.

In this case, the control unit 29 utilizes a memory unit 32. The memory unit 32 is composed of mainly a dedicated memory (not shown) with a control program to be executed by a CPU in the control unit 29 stored therein, a read/write memory (not shown) to provide a working area for the CPU, and a nonvolatile memory (not shown) in which a variety of setting information and control information, etc. is stored.

Figure 4:
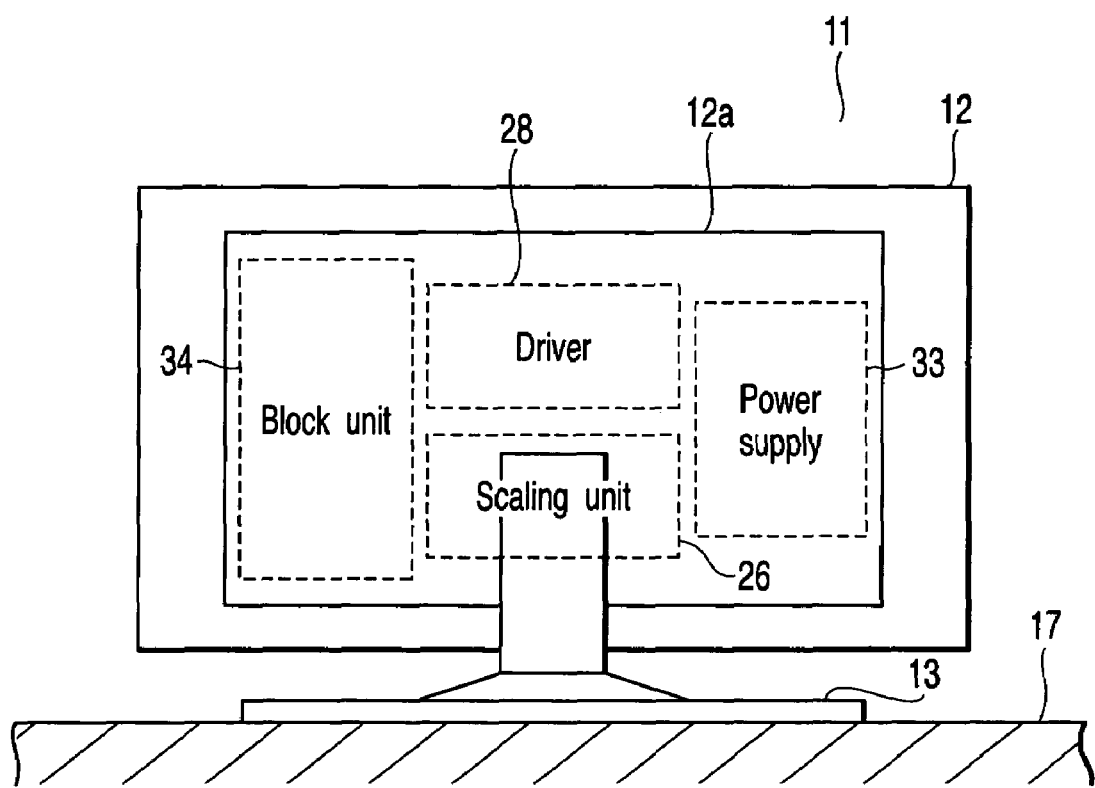
FIG. 4 is a rear elevation view for explaining the appearance of the TV receiving apparatus in the embodiment.

FIG. 4 shows a rear view of the TV receiving apparatus. In the housing unit 12a of the cabinet 12, the driver 28 and the scaling unit 26 are disposed at its center part, a power unit 33 is disposed on the right side in FIG. 4, and a block unit 34 including the other units is disposed on the left side in FIG. 4.

FIG. 5 shows the details of the scaling unit 26. The horizontal components among the video signals derived from the selector 23 are supplied to a selector 26f through weighting filters 26b, 26c, 26d and 26e which are multistage-connected (4 stages in the case of FIG. 5) via an input terminal 26a. The outputs from each filter 26b, 26c and 26d are also supplied to the selector 26f.

On the other hand, the vertical components among the video signals derived from the selector 23 are supplied to a selector 26l through weighting filters 26h, 26i, 26j and 26k which are multistage-connected (4 stages in the case of FIG. 5) via an input terminal 26g. The outputs from each filter 26h, 26i and 26j are also supplied to the selector 26f.

The selectors 26f, 26l respectively and selectively derive one of four inputs on the basis of a selection control signal from the control unit 29. After this, the video signals derived from each selector 26b, 26l are composed at a compositing unit 26n and output to the video processing unit 27 though an output terminal 26o.

The weighting filters 26b, 26c, 26d, and 26e respectively function so as to generate new pixels at positions at which two pixels adjacent in the horizontal direction are mutually weighted by the ratio of roughly 3:1.

Figure 6:
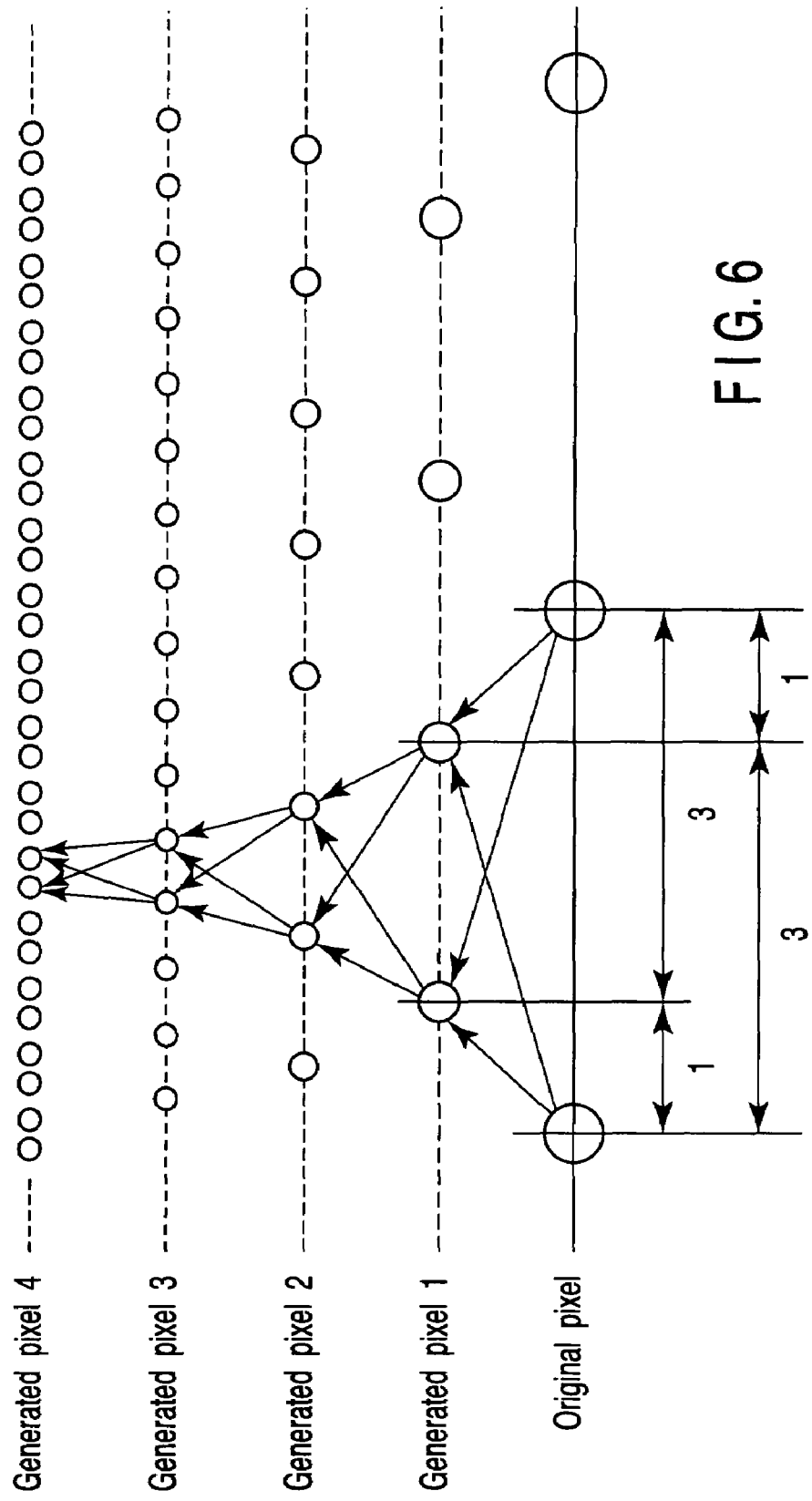
FIG. 6 is a view for explaining a one-dimensional operation of the scaling unit of the TV receiving apparatus in the embodiment.

That is, as shown in FIG. 6, the weighting filter 26b generates a new signal, as shown by a generated pixel 1, at the position at which the horizontally adjacent two original pixels input to the input terminal 26a are mutually weighted by the ratio of 3:1.

The weighting filter 26c generates a new pixel, as shown by a generated pixel 2, at the position at which the adjacent two pixels of the input precedingly generated pixel 1 are mutually weighted by the ratio of 3:1.

The weighting filter 26d generates a new pixel, as shown by a generated pixel 3, at the position at which the adjacent two pixels of the input precedingly generated pixel 2 are mutually weighted by the ratio of 3:1.

Moreover, the weighting filter 26e generates a new pixel, as shown by a generated pixel 4, at the position at which the adjacent two pixels of the input precedingly generated pixel 3 are mutually weighted by the ratio of 3:1.

Accordingly, the scaling unit 26 can generate an infinite number of new pixels with uniform weights for the original pixels. Then, the selector 26f selects any of the generated pixels 1, 2, 3 and 4 on the basis of the selection control signal from the control unit 29.

The weighting filters 26h, 26i, 26j and 26k also function to generate new pixels at the positions at which the vertically adjacent two pixels are weighted by the ratio 3:1, respectively.

The selector 26l selects any one of the pixels generated through the weighting filters 26h, 26i, 26j and 26k, based on the selection control signal from the control unit 29.

In this case, the control unit 29 generates the selection control signal in response to the magnification of scaling. After this, the compositing unit 26n composes the generated pixels derived from each selector 26f, 26l and a flat screen is structured by the newly generated pixels.

Figure 7:
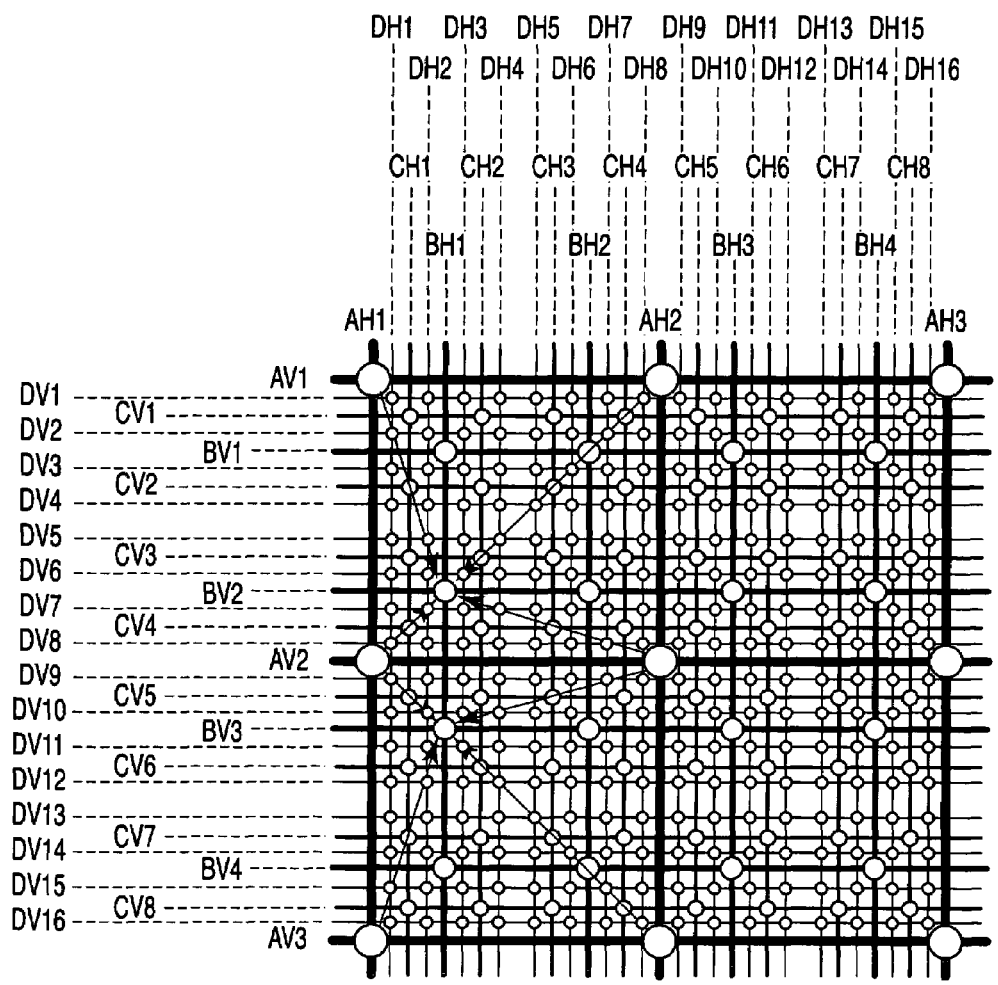
FIG. 7 is a view for explaining a two-dimensional operation of the scaling unit of the TV receiving apparatus in the embodiment.

FIG. 7 shows in a plane a manner of generation of new pixels by means of the weighting filters 26b, 26c, 26d and 26e and the weighting filters 26h, 26i, 26j and 26k.

FIG. 7 shows the manner in which the pixels are generated in a plane such that new pixels BH1-BH4 and BV1-BV4 are generated from original pixels AH1, AH2, AH3, AV1, AV2 and AV3, then, new pixels CH1-CH8 and CV1-CV8 are generated therefrom, and furthermore, new pixels DH1-DH16 and DV1-DV16 are generated.

For example, pixels referred to as BH1, BV2, as shown by arrows in FIG. 7 are composed of pixels referred to as AH1, AV1, pixels referred to as AH2, AV1, pixels referred to as AH1, AV2 and pixels referred to as AH2, AV2, respectively.

Figure 8:
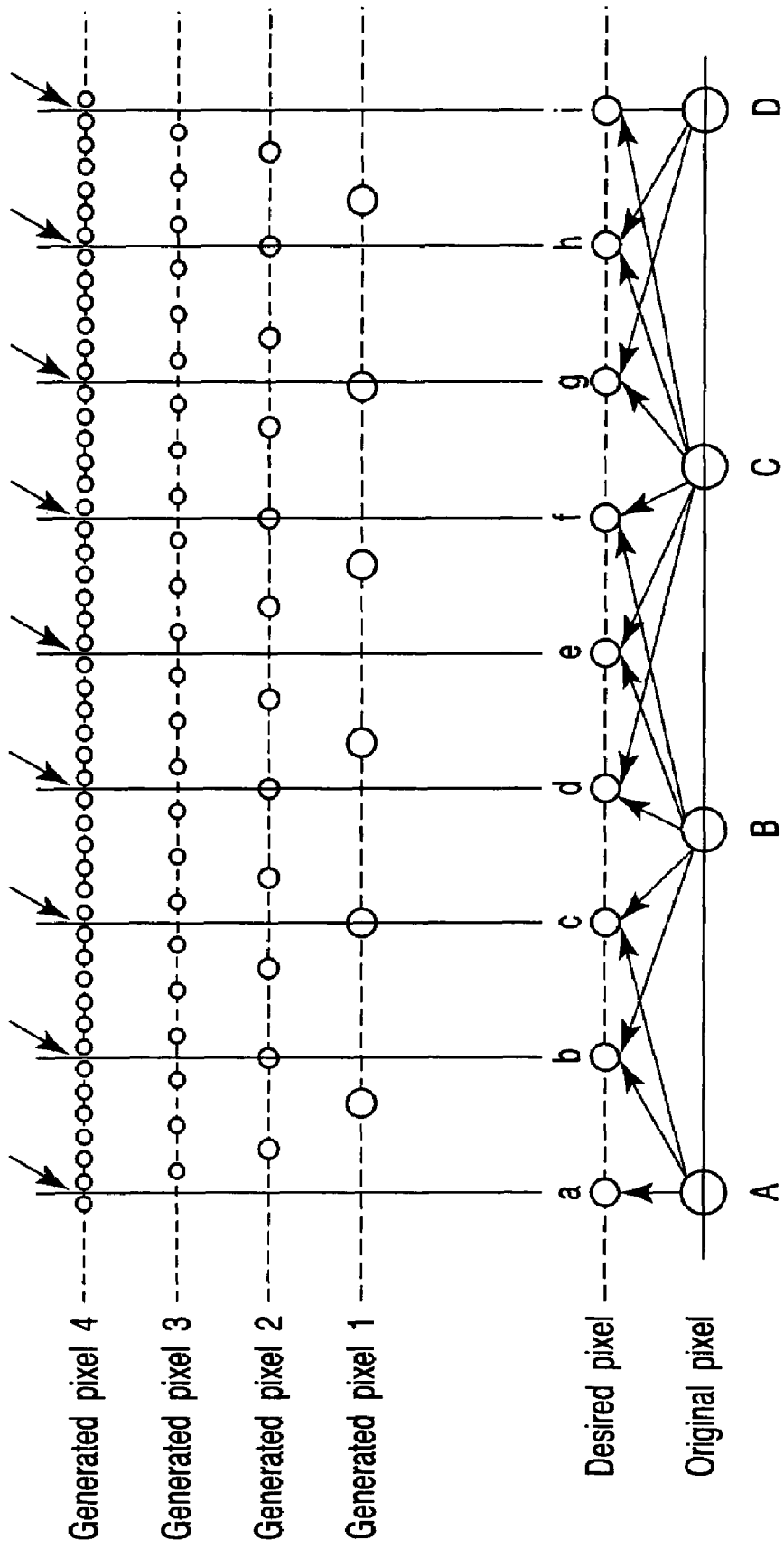
FIG. 8 is a view for explaining a main operation of the scaling unit of the TV receiving apparatus in the embodiment.

FIG. 8 shows relations among pixels of the input video signal (original pixels), pixels (desired pixels) on the display panel 14a of the video display unit 14 and generated pixels 1-4. That is, in the case that the scaling unit 26 intends to acquire desired pixels a-i from original pixels A-D, at present, the scaling unit 26 individually performs weighted-filtering processing of the original pixels in response to positions of the desired pixels and acquires each desired pixel a-i.

However, in the event that frequency characteristics of the weighting filters differ for each of the generated pixels, as mentioned above, since unevenness of attenuation in noise is caused, the intensities of the noises appear as scaling stripes.

In this embodiment, the scaling unit 26 generates a plurality of new pixels at positions at which the adjacent two pixels are weighted by the ratio of 3:1 by using the weighting filters 26b-26e and 26h-26k, and selects the pixel most similar to the desired pixels from the generated pixels 1-4, as shown by arrows in FIG. 8. Since all frequency characteristics of the weighting filters 26b-26e and 26h-26k to be used are made the same, the occurrence of the scaling stripes can be suppressed.

Figures 9, 10:
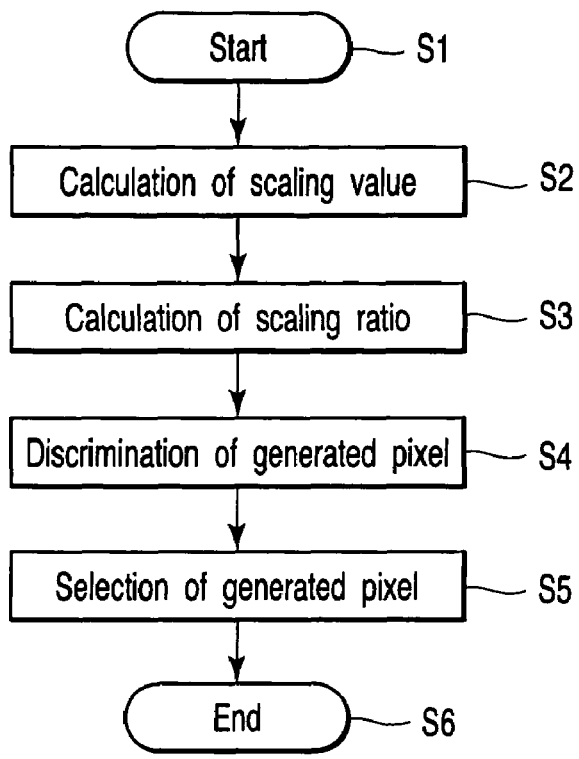
FIG. 9 is a flowchart for explaining a main operation of the scaling unit of the TV receiving apparatus in the embodiment.
FIG. 10 is a view for explaining a cable used by the scaling unit of the TV receiving apparatus in the embodiment.

FIG. 9 shows the flowchart as a whole in which operations to select pixels corresponding to ratios of the scaling among the infinite number of generated pixels. When processing is started (step S1), the control unit 29 calculates scaling values from the number of pixels of the input video signal and the number of pixels to be output (step S2).

These scaling values are those that, for example in FIG. 8, in the event that the original pixel A and the desired pixel "a" are positioned at the same position, indicates how far the desired pixel "b" is positioned away from the desired pixel "a".

The control unit 29 performs scaling ratio calculation to discriminate positions of the desired pixels b-i from the scaling values calculated in step S3 and discriminates the generated pixels corresponding to the calculated scaling ratio.

In this discrimination, the memory unit 32 stores a table in which, for example, ratios as shown in FIG. 10, are associated with the generated pixels 1-4 shown in FIG. 6, and the TV receiving apparatus 11 can discriminate the generated pixels corresponding to the calculated ratios, by referring to this table.

When the generated pixels are discriminated, the control unit 29 outputs the selection control signal to select the generated pixel in step S5 and terminates this processing (step S6).

In the described embodiment, though the scaling unit 26 generates four kinds of generated pixels 1-4 by using four weighting filters 26b-26e and 26h-26k in the horizontal and vertical directions, respectively, it is possible to increase the number of steps of the weighting filters 26b-26e and 26h-26k and increase the number of the generated pixels up to five or more. The number of the generated pixels can be appropriately set in accordance with a processing speed, a circuit scale, desired image quality, etc.

Respective weighting filters 26b-26e and 26h-26k are required to have the functions to generate new pixels at the positions at which the adjacent new pixels are mutually weighted by the ratios of roughly 3:1, respectively. In other words, it is required for all the filters to have the same frequency characteristics.

Though the embodiment above stated is an example adopted for the TV receiving apparatus 11, the invention is not limited to such an example, and it is possible to be adopted for, for example, an STB or a PDA.

FIG. 11 shows a block diagram of an STB 35. The STB 35 will be explained by referring to the same symbols for the same parts as those of FIG. 3. The video signal generated from the video processing unit 27 is output through an output terminal 36. A flat panel display 39 with a driver 37 and a video display unit 38 displays the video signal output through the output terminal 36 as a video display.

Figure 12:
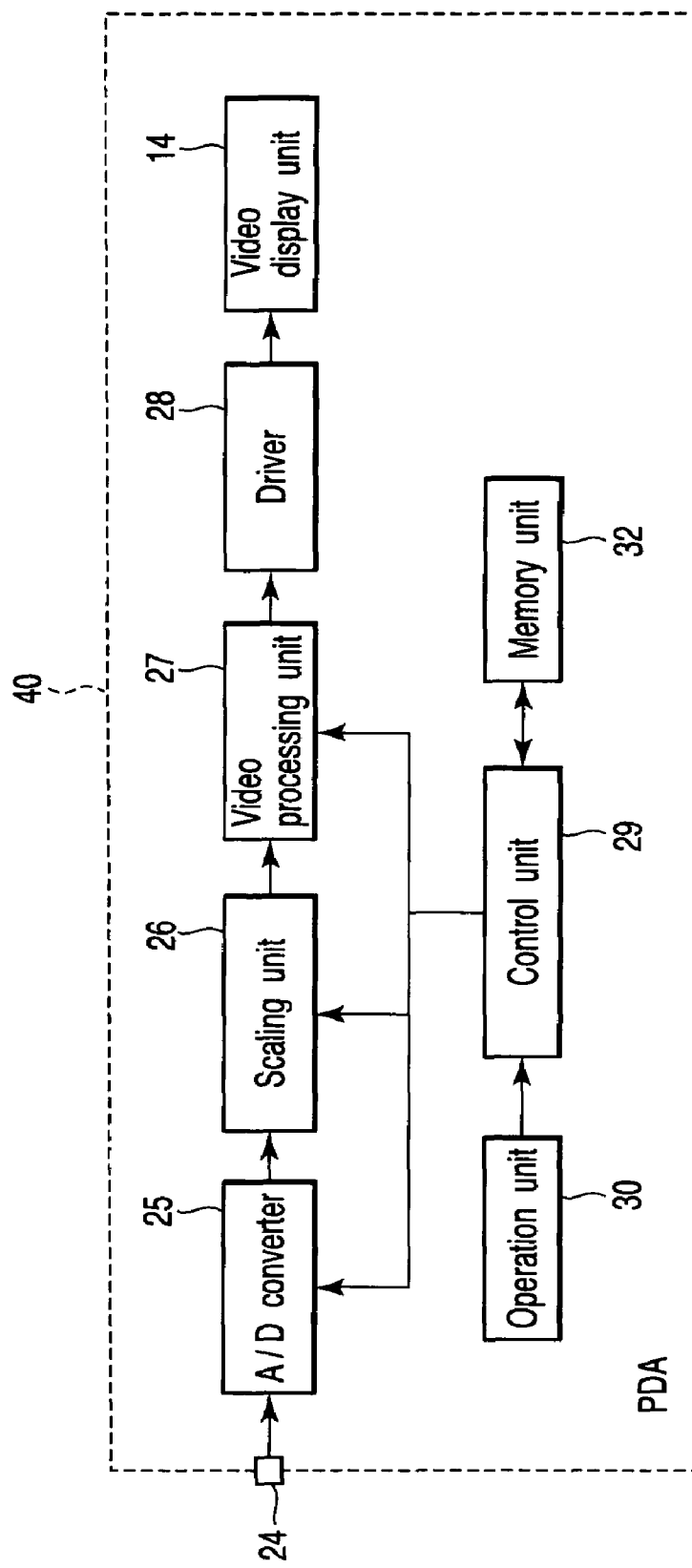
FIG. 12 is a block diagram for explaining one example of a personal digital assistant (PDA) with the present invention adopted thereto.

FIG. 12 shows a PDA 40. The PDA 40 will be explained by referring to the same symbols for the same parts as those of FIG. 3. The PDA 40 becomes a mobile information terminal which is not provided with the antenna 18, the input terminal 19, the tuner unit 20, the frequency converter 21, the digital signal processing unit 22, the selector 23, the receiving unit 16, and the like.

It is possible for the scaling unit 26 of the STB 35 and the PDA 40 to be configured as shown in FIG. 5.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for processing a video signal, comprising:
a receiving unit which receives the video signal;
a filter unit which repeats two or more times a process of (i) generating a new pixel at a position at which adjacent pixels of the received video signal are mutually weighted by a ratio of roughly 3:1 and (ii) generating a new pixel at a position at which precedingly generated adjacent pixels are mutually weighted by a ratio of roughly 3:1; and
a selection unit which selects a pixel similar to a desired pixel among pixels processed two or more times by the filter unit on the basis of a scaling ratio to discriminate a position of a pixel to be output.

2. The apparatus for processing the video signal according to claim 1, further comprising:
a calculation unit which calculates the scaling ratio on the basis of the number of pixels of the video signal received by the receiving unit and the number of pixels to be output; and
a video display unit which makes a video display on the basis of the pixel selected by the selection unit,
wherein the selection unit selects a pixel similar to a desired pixel among pixels processed two or more times by the filter unit on the basis of the scaling ratio calculated by the calculation unit.

3. An apparatus for processing a video signal, comprising:
a receiving unit which receives a broadcast signal;
a processing unit which recovers a video signal from the broadcast signal received by the receiving unit;
a filter unit which repeats two or more times a process of (i) generating a new pixel at a position at which adjacent pixels of the received video signal are mutually weighted by a ratio of roughly 3:1 and (ii) generating a new pixel at a position at which precedingly generated adjacent pixels are mutually weighted by a ratio of roughly 3:1;
a calculation unit which calculates a scaling ratio to discriminate a position of a pixel to be output on the basis of the number of pixels of the video signal recovered by the processing unit and the number of pixels to be output;

a selection unit which selects a pixel similar to a desired pixel among pixels processed two or more times by the filter unit on the basis of the scaling ratio calculated by the calculation unit; and a video display unit which makes a video display on the basis of the pixel selected by the selection unit.

4. The apparatus for processing the video signal according to claim 3, further comprising an output unit, instead of the video display unit, which outputs the pixel selected by the selection unit.

5. The apparatus for processing the video signal according to any one of claims 1-4, wherein the filter unit comprises;

a plurality of multi-staged first weighting filters which generate new pixels at positions at which horizontally adjacent pixels of the input video signal are mutually weighted by ratios of roughly 3:1, respectively; and a plurality of multi-staged second weighting filters which generate new pixels at positions at which vertically adjacent pixels of the input video signal are mutually weighted by ratios of roughly 3:1, respectively, wherein at least one of the plurality of multi-staged first weighting filters and the plurality of multi-staged second weighting filters generates the new pixels at positions at which the adjacent pixels of the input video signal are mutually weighted by a ratio of 3:1.

6. The apparatus for processing the video signal according to claim 5, wherein the selection unit comprises;

a first selection unit which selects a pixel similar to a desired pixel respectively generated from the plurality of first weighting filters on the basis of the scaling ratio;

a second selection unit which selects a pixel similar to a desired pixel respectively generated from the plurality of second weighting filters on the basis of the scaling ratio; and a compositing unit which composes the pixel selected by the first selection unit and the pixel selected by the second selection unit.

7. A method for processing a video signal, comprising:

receiving the video signal;

repeating a filtering process two or more times of (i) generating a new pixel at a position at which adjacent pixels of the received video signal are mutually weighted by a ratio of roughly 3:1 and (ii) generating a new pixel at a position at which precedingly generated adjacent pixels are mutually weighted by a ratio of roughly 3:1;

selecting a pixel similar to a desired pixel among pixels performed filtering processing in two or more times on the basis of a scaling ratio to discriminate a position of a pixel to be output on a display.

8. The method for processing the video signal according to claim 7, further comprising making a video display on the basis of the pixel selected, and wherein the receiving of the video signal comprises:

receiving a broadcast signal including the video signal; and recovering the video signal from the received broadcast signal, and wherein the selection of the pixel comprises:

calculating the scaling ratio on the basis of the number of pixels of the recovered video signal and the number of pixels to be output; and selecting a pixel similar to a desired pixel among pixels preformed filtering processing in two or more times on the basis of the calculated scaling ratio.

9. The method for processing the video signal according to claim 8, further comprising outputting the selected pixel.

10. The method for processing the video signal according to claim 7, wherein the selecting a pixel comprises:

calculating the scaling ratio on the basis of the number of pixels of the received video signal and the number of pixels to be output; and selecting a pixel similar to a desired pixel among pixels performed filtering processing in two or more times on the basis of the calculated scaling ratio.

11. The method for processing the video signal according to any one of claims 7-10, wherein the repeated filtering process comprises:

generating a new pixel at a position at which horizontally adjacent pixels of an input video signal are mutually weighted by a ratio of roughly 3:1, by each of a plurality of multiple-staged first weighting filters; and generating a new pixel at a position at which vertically adjacent pixels of an input video signal are mutually weighted by a ratio of roughly 3:1, by each of a plurality of multiple-staged second weighting filters, wherein at least one of the plurality of multiple-staged first weighting filters and the plurality of multiple-staged second weighting filters generates the new pixels at positions at which the adjacent pixels of the input video signal are mutually weighted by a ration of 3:1.

12. The method for processing the video signal according to claim 11, wherein the selecting a pixel comprises:

first selecting of selecting a pixel similar to a desired pixel respectively generated from the plurality of first weighting filters on the basis of the scaling ratio;

second selecting of selecting a pixel similar to a desired pixel respectively generated from the plurality of second weighting filters on the basis of the scaling ratio; and composing the pixel selected by the first selecting and the pixel selected by the second selecting with each other.

* * * * *